(12) United States Patent
Hagale et al.

(10) Patent No.: US 7,526,525 B2
(45) Date of Patent: Apr. 28, 2009

(54) METHOD FOR EFFICIENTLY DISTRIBUTING AND REMOTELY MANAGING MEETING PRESENTATIONS

(75) Inventors: Anthony Richard Hagale, Austin, TX (US); Ryan Rozich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 10/897,227

(22) Filed: Jul. 22, 2004

(65) Prior Publication Data

US 2006/0020665 A1    Jan. 26, 2006

(51) Int. Cl.
G06F 15/16    (2006.01)
(52) U.S. Cl. .................................... 709/204; 709/227
(58) Field of Classification Search ................. 709/208, 709/227, 204, 206, 207
See application file for complete search history.

(56) References Cited

U.S. PATENT DOCUMENTS

| | | | | |
|---|---|---|---|---|
| 5,859,979 A * | 1/1999 | Tung et al. | ................... | 709/228 |
| 5,991,760 A | 11/1999 | Gauvin et al. | .................. | 707/10 |
| 5,999,966 A * | 12/1999 | McDougall et al. | ......... | 709/204 |
| 6,161,137 A * | 12/2000 | Ogdon et al. | ............... | 709/224 |
| 6,167,432 A | 12/2000 | Jiang | .......................... | 709/204 |
| 6,532,218 B1 | 3/2003 | Shaffer et al. | ............... | 370/260 |
| 6,560,637 B1 | 5/2003 | Dunlap et al. | ............... | 709/204 |
| 6,587,870 B2 | 7/2003 | Takagi et al. | ................. | 709/204 |
| 6,721,794 B2 * | 4/2004 | Taylor et al. | ................. | 709/231 |
| 7,133,896 B2 * | 11/2006 | Ogdon et al. | ............... | 709/205 |
| 7,213,051 B2 * | 5/2007 | Zhu et al. | ..................... | 709/205 |
| 7,330,875 B1 * | 2/2008 | Parasnis et al. | ............. | 709/204 |
| 2002/0019845 A1 | 2/2002 | Hariton | ....................... | 709/205 |
| 2002/0129222 A1 | 9/2002 | Aukia et al. | .................... | 712/1 |
| 2003/0005052 A1 * | 1/2003 | Feuer et al. | .................. | 709/204 |
| 2003/0120690 A1 | 6/2003 | Schaeffer et al. | ............ | 707/500 |
| 2003/0191805 A1 * | 10/2003 | Seymour et al. | ............ | 709/204 |
| 2003/0212744 A1 | 11/2003 | Dunlap et al. | ............... | 709/204 |
| 2003/0227479 A1 | 12/2003 | Mizrahi et al. | ............... | 345/753 |
| 2003/0236889 A1 | 12/2003 | Manion et al. | ............... | 709/227 |
| 2004/0002048 A1 * | 1/2004 | Thurmaier et al. | .......... | 434/350 |
| 2004/0019640 A1 | 1/2004 | Bartram et al. | ............. | 709/205 |
| 2004/0088384 A1 * | 5/2004 | Taylor et al. | ................. | 709/219 |
| 2004/0125933 A1 * | 7/2004 | Jun et al. | ................ | 379/202.01 |
| 2004/0128350 A1 * | 7/2004 | Topfl et al. | ................... | 709/204 |

* cited by examiner

*Primary Examiner*—Saleh Najjar
*Assistant Examiner*—Edward J Kim
(74) *Attorney, Agent, or Firm*—Yee & Associates, P.C.; Herman Rodriguez

(57) ABSTRACT

A mechanism is provided for efficiently distributing and remotely managing meeting presentations. Participants download presentation documents to local storage ahead of time. The presentation then runs in an environment that allows the meeting host to send events to the participants to remotely manage the meeting. In one preferred embodiment, the participants are allowed to control the meeting events locally and a status is transmitted back to the host. The host may then view the status of each of the participants to help control progress through the meeting.

1 Claim, 9 Drawing Sheets

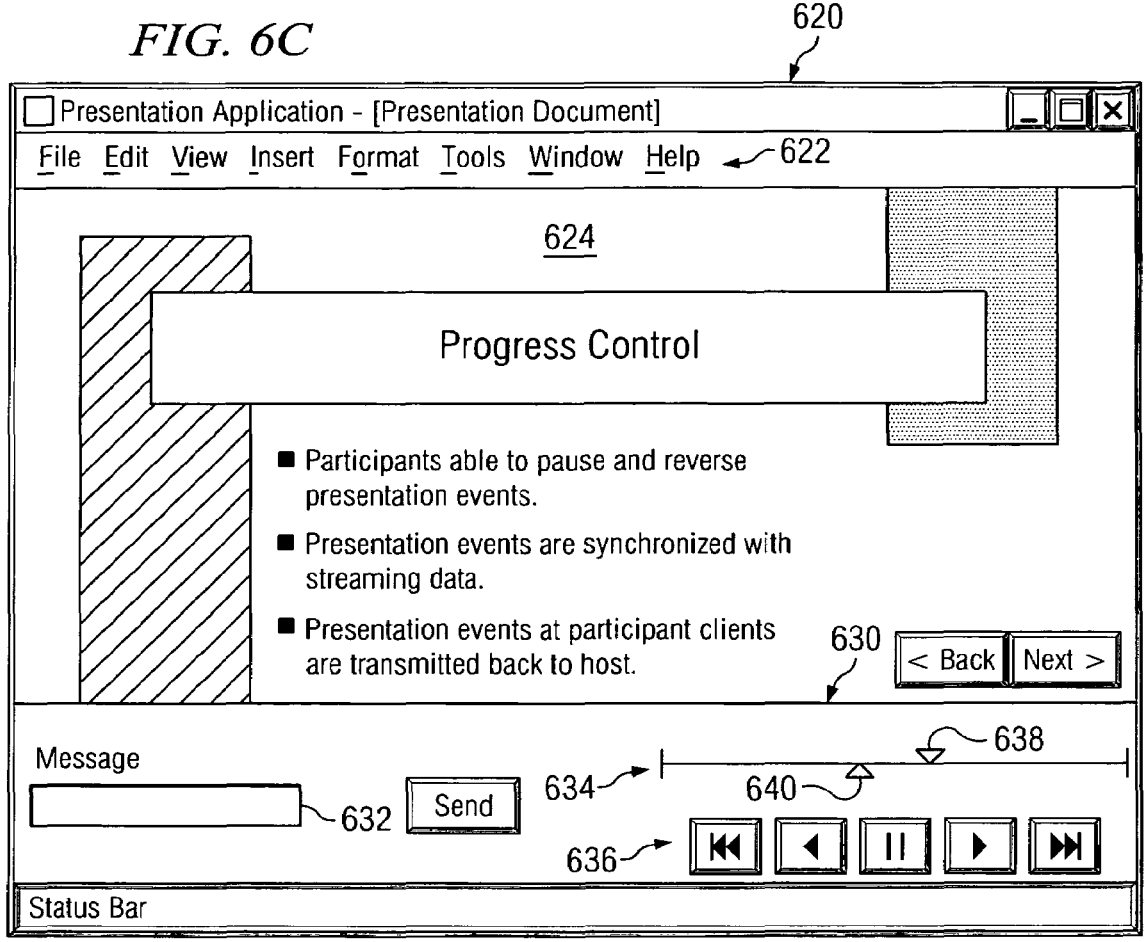
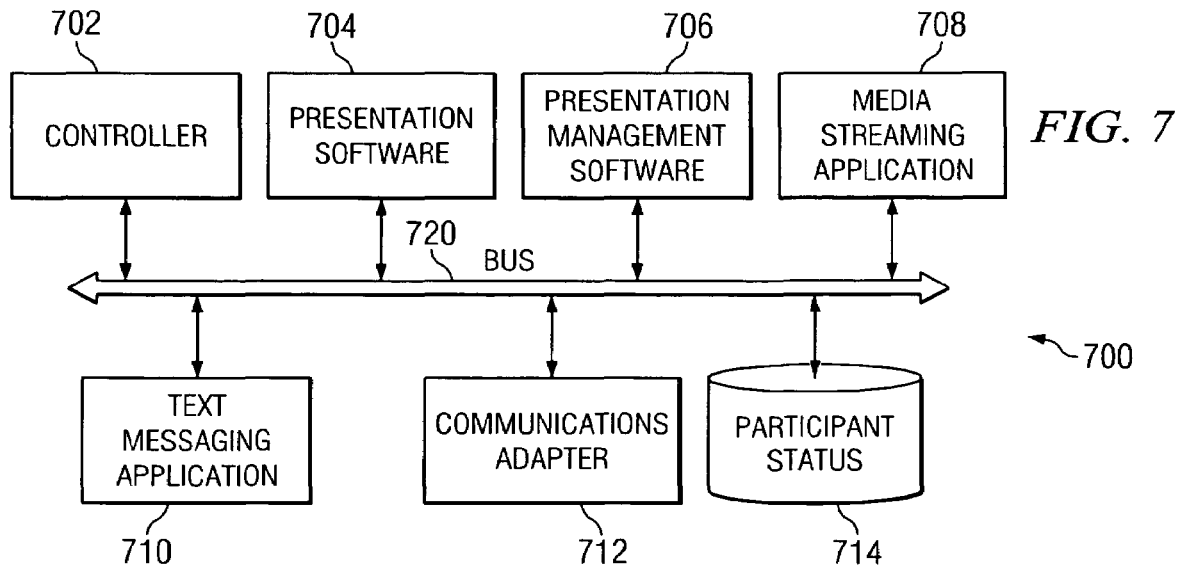

METHOD FOR EFFICIENTLY DISTRIBUTING AND REMOTELY MANAGING MEETING PRESENTATIONS

BACKGROUND OF THE INVENTION

1. Technical Field

The present invention relates to data processing and, in particular, to remote meeting presentations in a network of data processing systems. Still more particularly, the present invention provides a method, apparatus, and program for efficiently distributing and remotely managing meeting presentations.

2. Description of Related Art

Computer systems have become commonplace in everyday life and in business. Interconnection among computer systems through networks and, in particular, the Internet has also become routine. As such, computer systems have become customary tools for communicating information and ideas.

Computer users employ applications, such as voice over Internet, text chat and instant messaging, video conferencing, and application sharing to communicate among parties over great distances, for business and pleasure. Application sharing, which can be used in an electronic meeting, is a data conferencing capability that lets two or more users interactively work on the same application at the same time. The application is loaded and running in only one machine; however, participants send keystrokes to the application and receive screen changes from the application.

In the prior art, meeting presentations occur by a meeting host acting as a server, sending screen shots at a high refresh rate to connected meeting participants. This requires a large amount of bandwidth and processing power by the host computer to transmit whole screens of display to multiple participants. Also, differences in color depth between the host and the remote computers often cause difficulties, because as each participant client attempts to present the screens of display, incompatibility with the color depth or display resolution of the host may result in errors or poorly rendered screens. Other applications, such as NetMeeting® from Microsoft Corporation and SameTime® from IBM Corporation, combine various aspects of text messaging, video conferencing, and application sharing.

Remote meeting presentations via screen sharing software may be problematic. A meeting host computer, which is commonly a laptop or other mobile computing device, must be able to handle the load of multiple remote connections. Furthermore, the differences in screen resolution, color depth, and the like among the host and the participants may cause distractions in meeting environments. For example, when there are excessive transmission delays or the presentation fails to display entirely, the meeting participants may be forced to cure connection problems or switch to off-line methods of distributed meeting presentations.

SUMMARY OF THE INVENTION

The present invention recognizes the disadvantages of the prior art and provides a mechanism for efficiently distributing and remotely managing meeting presentations. Participants download presentation documents to local storage ahead of time. The presentation then runs in an environment that allows the meeting host to send events to the participants to remotely manage the meeting. In one preferred embodiment, the participants are allowed to control the meeting events locally and a status is transmitted back to the host. The host may then view the status of each of the participants to help control progress through the meeting.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A-6D depict example screens of display for an online meeting presentation environment in accordance with a preferred embodiment of the present invention;

FIG. 7 is an exemplary functional block diagram of a host-side online meeting presentation system in accordance with a preferred embodiment of the present invention;

DETAILED DESCRIPTION OF THE PREFERRED EMBODIMENT

Figure 1:
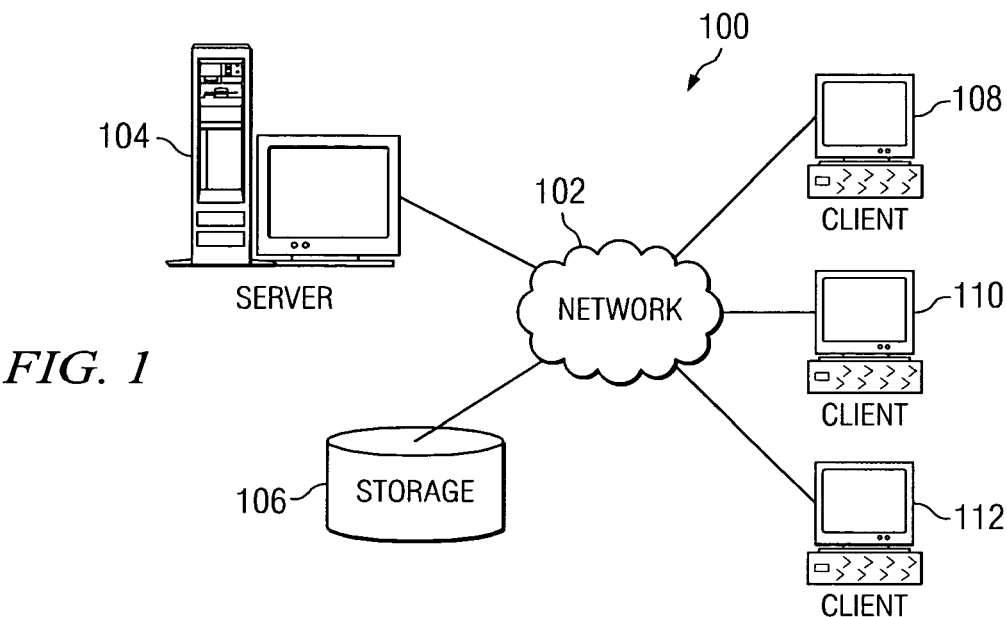
FIG. 1 depicts a pictorial representation of a network of data processing systems in which the present invention may be implemented.
Figure 2:
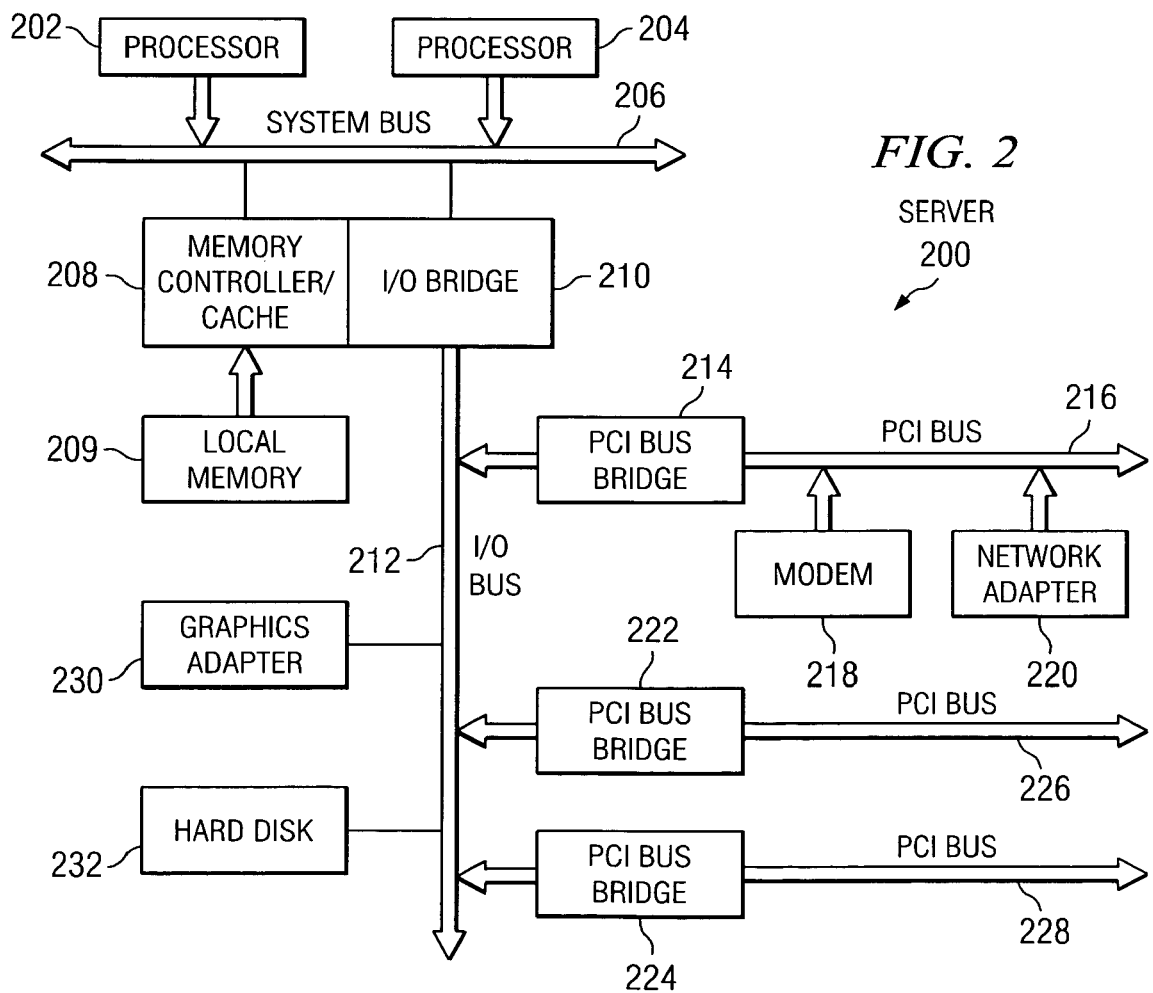
FIG. 2 is a block diagram of a data processing system that may be implemented as a server in accordance with a preferred embodiment of the present invention.
Figure 3:
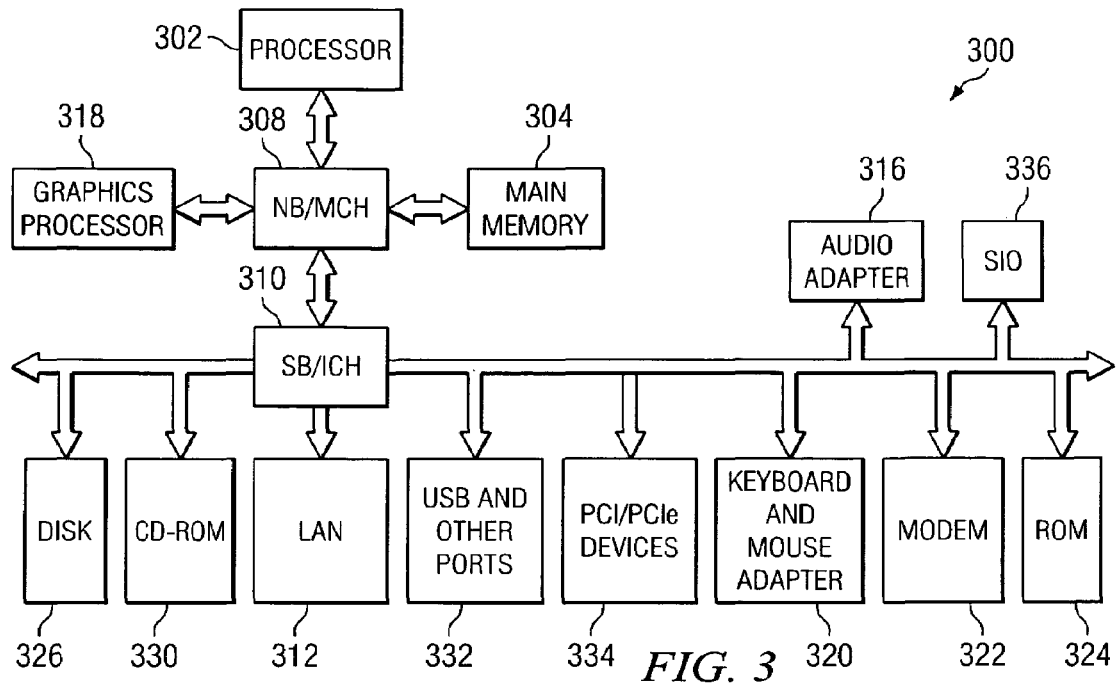
FIG. 3 is a block diagram of a data processing system in which the present invention may be implemented.

The present invention provides a method, apparatus and computer program product for efficiently distributing and remotely managing meeting presentations. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 and storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with a preferred embodiment of the present invention, server 104 may provide access to presentation documents (not shown) for download prior to a scheduled electronic meeting. For example, meeting host client 108 may upload a presentation document, such as a Microsoft Powerpoint® or Lotus Freelance Graphics™ presentation (not shown), to storage 106 through server 104. Participant clients 110 and 112 may then download the presentation documents from storage 106 through server 104 at any time prior to the electronic meeting.

At the time of the electronic meeting, meeting host client 108 controls the meeting using presentation management software. When meeting host client 108 activates a presentation event, such as a "next slide" event in the presentation software application, a presentation event message, which identifies the event activated by host client 108, is transmitted to all participant clients 110, 112. Event messages may be transmitted directly from one client to another client through network 102 or may be transmitted through network 102 indirectly using a server, such as server 104.

Each participant client 110, 112 controls the progress or position within the meeting locally and sends status event messages back to host client 108. A status event message indicates a given participant's progress or position within the electronic meeting presentation. For example, participant client 110 may be taking longer to examine a slide in the presentation and may be one slide behind participant client 112. In this case, status information returned from participant client 110 will indicate the position in the electronic presentation and host 108 will be able to determine this progress with respect to the progress of participant 112.

Also, host 108 may transmit streaming content to the participants 110, 112. Streaming content may include, for example, streaming audio or video that accompanies and explains the presentation. Video and audio may be streamed using known video conferencing techniques. Text messaging may also be used to compliment the meeting system. For example, a host may send speech and video along with presentation events; however, participants may transmit questions back to the host as text messages so as not to interrupt the meeting.

Presentation event messages may be associated with streaming content or text messages to allow participants to see or hear the context in which a slide or other presentation event is presented, as explained in further detail herein. Participant status messages may also be associated with streaming content or text messages. In one preferred embodiment, a text message may include an indicator or control that identifies the status of the participant that sent the text message. For example, when host 108 receives a question in the form of a text message from one of participants 110, 112, host 108 may select, from the text message, an indicator or control to determine the portion (e.g. slide) of the presentation the participant was viewing when the question was asked.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4A:
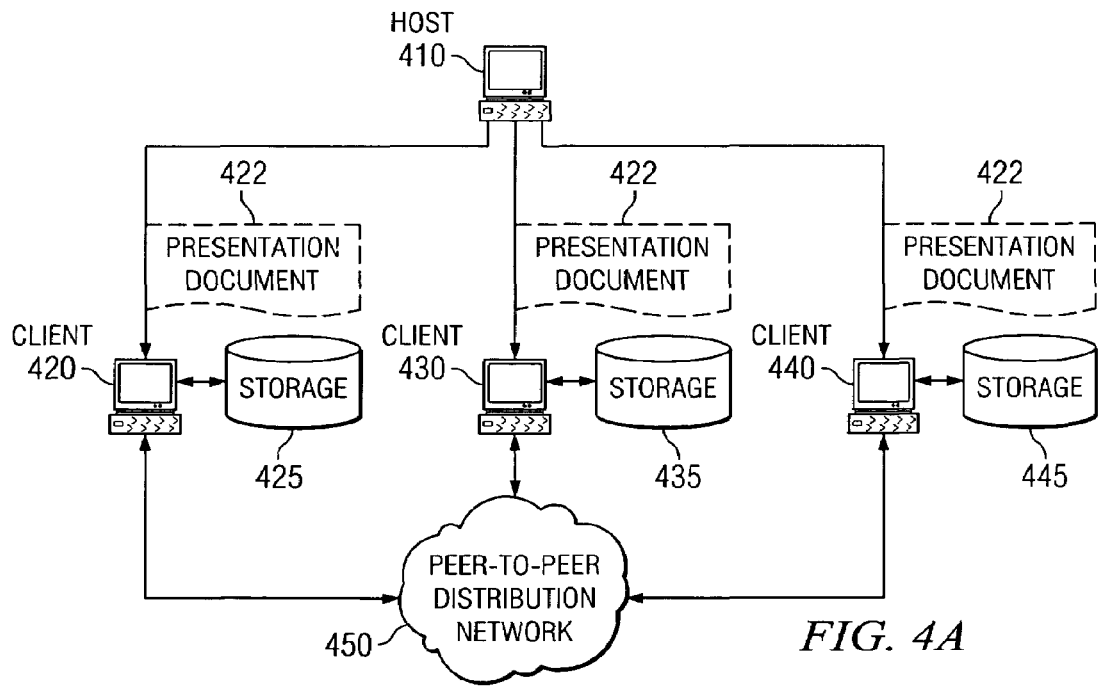
FIGS. 4A-4E illustrate an online meeting presentation environment in accordance with a preferred embodiment of the present invention.

FIGS. 4A-4E illustrate an online meeting presentation environment in accordance with a preferred embodiment of the present invention. More particularly, FIG. 4A illustrates an online meeting environment for efficiently distributing presentation documents. Host 410 is a source for a presentation document. Client 420 downloads presentation document 422 and stores the document in storage 425. Client 430 downloads presentation document 422 and stores the document in storage 435. Client 440 downloads presentation document 422 and stores the document in storage 445.

Presentation document 422 may be a document for any suitable software application that may be used to present information during a meeting. For example, a presentation document may be a word processing document, a diagramming document, a computer aided design document, a spreadsheet, or a presentation graphics document. Host 410 owns the master document and may view and manipulate the document using the appropriate software application. Once a participant downloads presentation document 422 to the client, the participant may use the same software application at the client to view the presentation document. Thus, each of host 410 and clients 420, 430, 440 includes the appropriate software for viewing presentation document 422.

Clients 420, 430, 440 may also facilitate delivery of presentation document 422 using peer-to-peer distribution network 450. Peer-to-peer network 450 is a communications environment that allows any computer in the network to act as a server and share its files with all other users on the network. Peer-to-peer networks are quite common in small offices that do not use a dedicated file server. In a peer-to-peer distribution system, files may be downloaded in pieces from the source or any other computer on the network that has a desired piece. BitTorrent™ is another example of a peer-to-peer distribution service that makes every downloading user an uploading user. When a user downloads pieces of a file using BitTorrent™, the user is also uploading those pieces to other users, which takes some of the load off the source of the file.

Figure 4B:
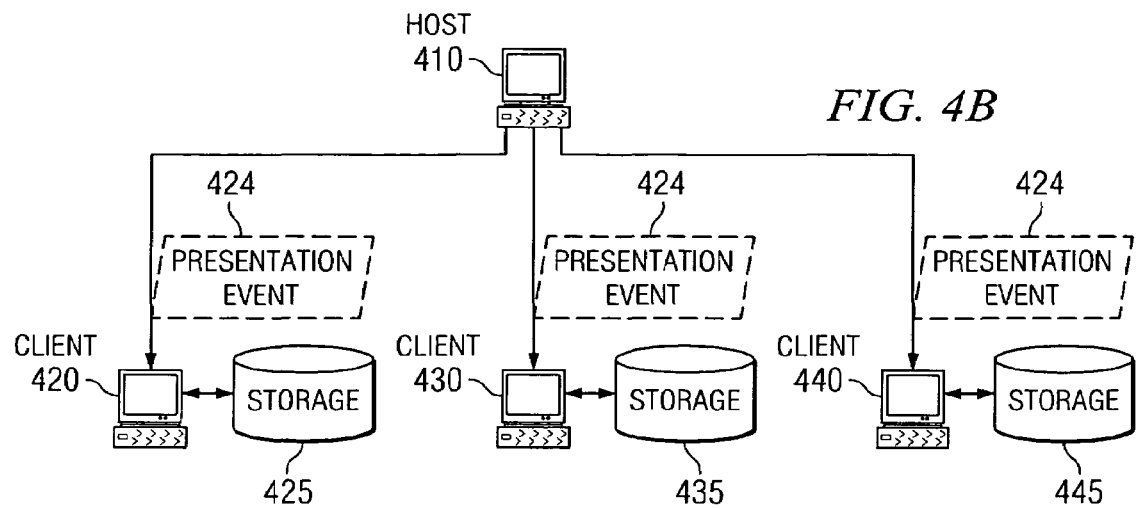

Turning now to FIG. 4B, at the time of the meeting, host 410 sends presentation event 424 to participant clients 420, 430, 440. For each action host 410 takes through the meeting presentation, the remote meeting presentation software running on host 410 generates and transmits a presentation event to all of participants 420, 430, 440. For example, a presentation event may correspond to an object being added to an organizational chart, a value changing in a spreadsheet, or a slide transition in a presentation graphics document. During the meeting, participant clients 420, 430, and 440 view the presentation document using the appropriate software application. Presentation events are initially effectuated using the application software, in conjunction with electronic meeting management software, thus allowing host 410 to control progress through the presentation at remote clients 420, 430, 440.

The presentation events received from host 410 may be stored locally at clients 420, 430, 440. For example, client 420 may store presentation events in storage 425, client 430 may store presentation events in storage 435, and client 440 may store presentation events in storage 445. Because the presentation events are in the client's storage, a participant may control progress through the presentation via host 410 or, in the alternative, locally. For example, if a participant needs more time to examine a presentation graphics slide, the participant may pause the presentation and store succeeding presentation events in chronological order. The participant may then step through the stored presentation events to catch up with the host and other participants. Alternatively, a participant may, at any time, step back to a previous presentation event for review.

Figure 4C:
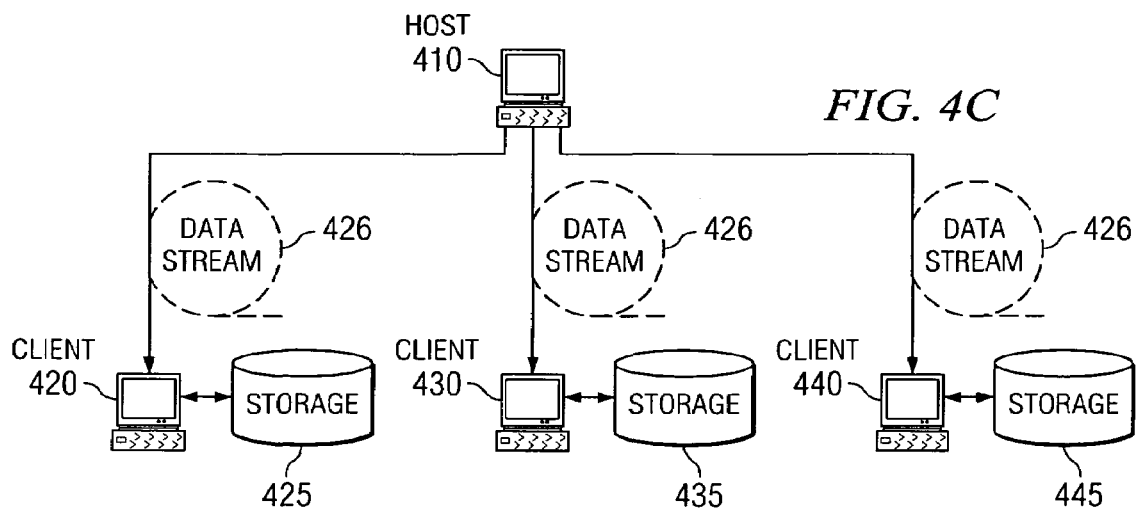

With reference now to FIG. 4C, host 410 may send data stream 426 to participant clients 420, 430, 440. A data stream may be audio, video, or other streaming media that may accompany the presentation. In one preferred embodiment, data stream 426 may include audio/video of the host presenter explaining the contents of the presentation document. Participant clients 420, 430, 440 may present data stream 426 to the participants using streaming media software that is known in the art. Other forms of streaming data, such as text messaging, may be used within the scope of the present invention.

In accordance with exemplary aspects of the present invention, presentation events may be indexed to data stream 426 such that the point in the data stream at which the presentation event was sent may be determined. Presentation events may be indexed by storing a time that is relative to the data stream. When a participant pauses the presentation locally at a client by selecting a control, the streaming media may be paused at the same time, but may still be recorded in a buffer. Presentation events will still be recorded, but not presented while the presentation is paused. Also, when a participant pauses or rewinds the media stream, the corresponding presentation events, as indexed according to a time reference of the data stream, may also be presented in association with data stream 426. Thus, a participant may review a presentation event in synchronization with the associated media stream.

Figure 4D:
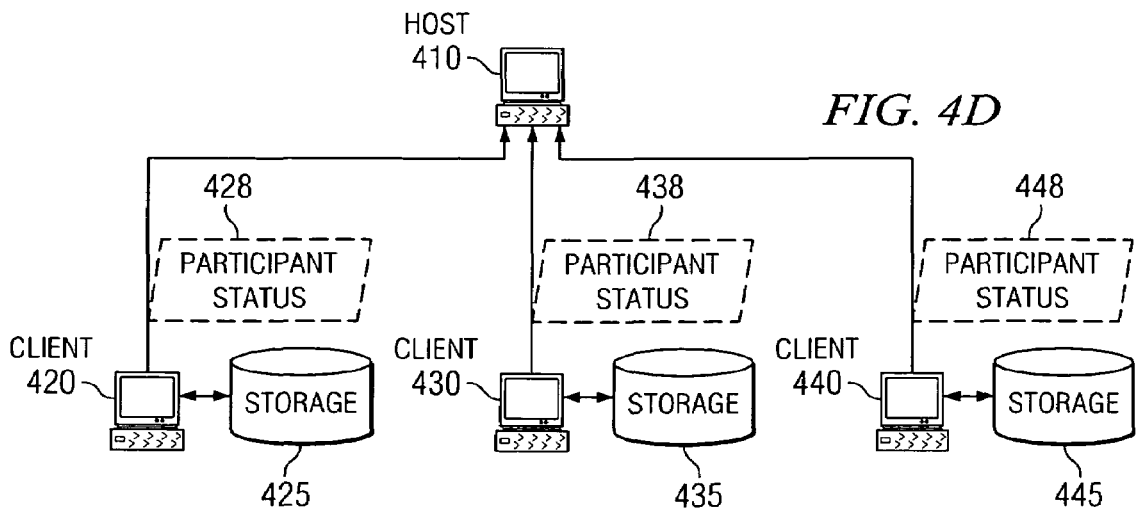

FIG. 4D illustrates a feedback mechanism for remotely managing a meeting presentation at host 410. Participant client 420 returns participant status message 428 to host 410. Similarly, participant client 430 returns participant status message 438 to host 410 and participant client 440 returns status message 448 to host 410. Participant status messages are presented to host 410 during the meeting presentation. Thus, if participant client 420 pauses the meeting presentation locally and steps back to a previous slide, host 410 becomes aware of this fact via participant status message 428. This allows host 410 to decide, for example, whether to delay the presentation to allow participant 420 to catch up, to return to a previous slide in the presentation with which participants may be having trouble, or to continue with the presentation.

Figure 4E:
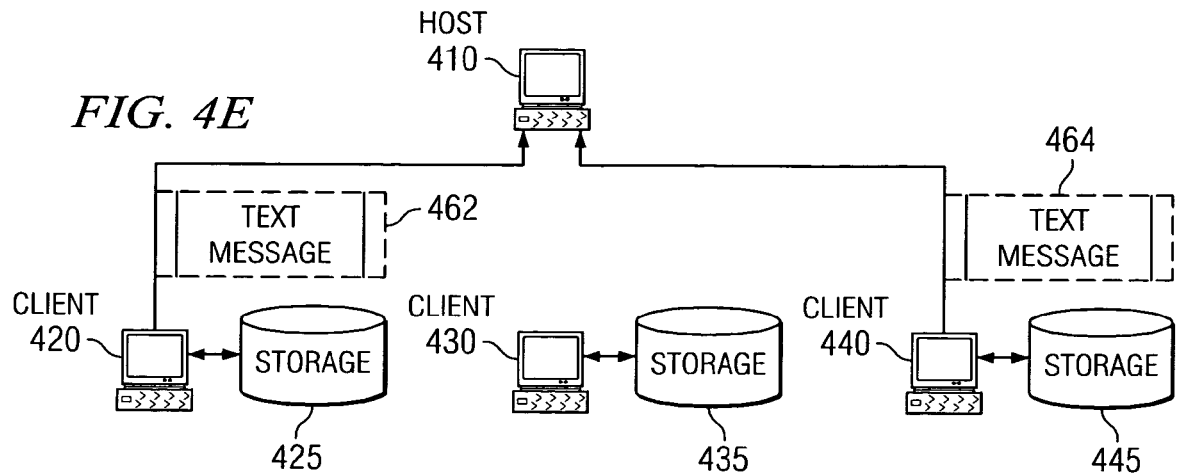

With reference to FIG. 4E, participants may send text messages 462, 464 to host 410. This allows participants 420, 440 to send direct feedback to host 410. For example, participant client 420 may send text message 462 to host 410 indicating that presentation content was already covered in a recent refresher seminar. As another example, participant client 440 may send text message 464 to ask a question about the presentation content.

Figure 5:
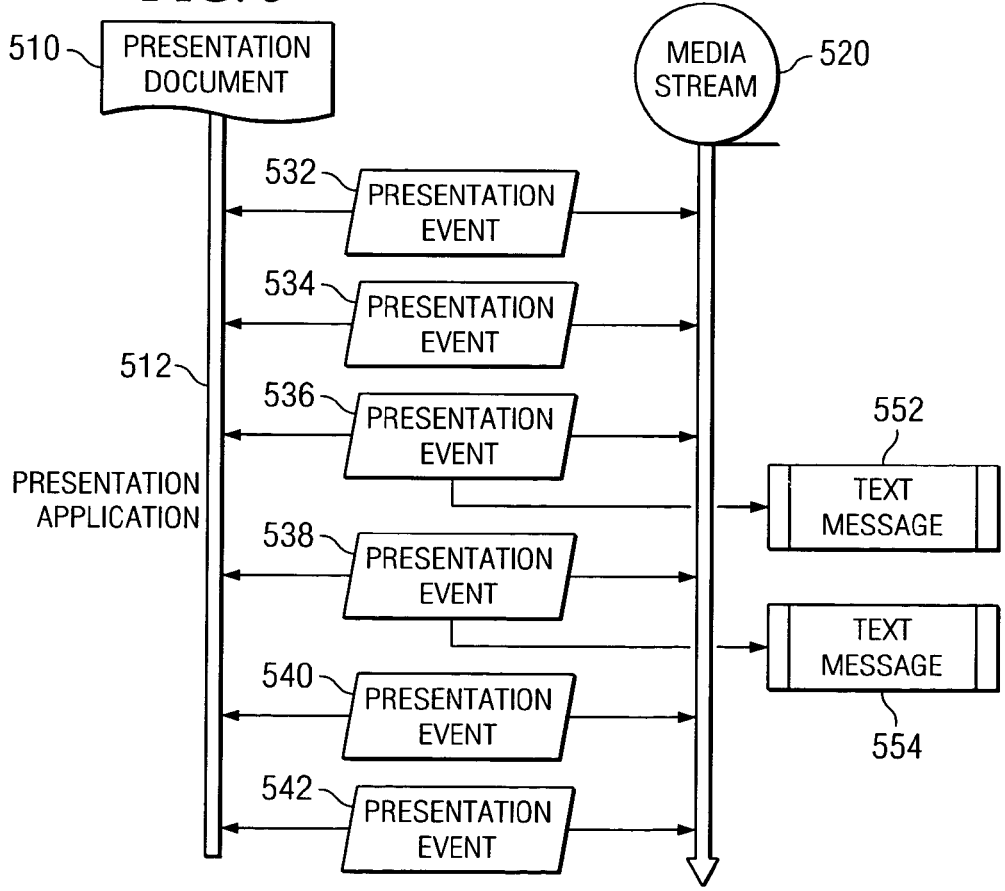
FIG. 5 is a block diagram illustrating the manner in which meeting presentation information is managed at a participant client in accordance with a preferred embodiment of the present invention.

FIG. 5 is a block diagram illustrating the manner in which meeting presentation information is managed at a participant client in accordance with a preferred embodiment of the present invention. Presentation document 510 is stored and presented using presentation application 512. As described above, presentation application 512 may be any suitable software application for presenting meeting presentation document 510. For example, presentation application 512 may be a word processing application, a diagramming application, a computer aided design application, a spreadsheet application, or a presentation graphics application.

Presentation application 512 may be modified to include the features of the present invention. Alternatively, the exemplary aspects of the present invention may be enabled using a plug-in application for an existing meeting presentation application. In yet another embodiment, a helper application may run in the operating system and listen to the input stream of the computer and extract events from and insert events into the input stream. Other techniques for adding functionality to applications may be apparent to those of ordinary skill in the art.

Participants (not shown) receive media stream 520 from the host (not shown) and store media stream 520 in local persistent storage (not shown). Participants receive presentation event 532-542 from the host and store presentation events 532-542. Presentation event 532 is received first and the event is effectuated using presentation application 512. Thus, presentation application 512 follows the actions taken by the host, allowing the participant to follow the media presentation as controlled remotely at the host computer.

Presentation event 532 is also indexed to media stream 520. Presentation events may be indexed to media stream 520 by interacting with a media streaming application, for example, an application programming interface (API). Alternatively, a starting time at which the media stream begins may be recorded. Presentation events 532-542 may be time stamped. Thus, the time within the media stream at which the presentation event occurred may be derived based on the time stamp of the event relative to the beginning time of the media stream. Other techniques for indexing presentation events to a media stream may be apparent to those of ordinary skill in the art.

Text messages 552, 554 may be generated at the participant client using a text messaging application. The text messaging application may be an existing text messaging application, such as AOL Instant Messenger™ from America Online Inc. Alternatively, text messaging may be integrated into a meeting presentation management application that is used to manage meeting presentations at a participant client, as in the present invention.

Text message 552 may include a reference to the last presentation event, in this example presentation event 536. Similarly, text message 554 may include a reference to presentation event 538, which is the last presentation event at the time of the text message. The reference to a presentation event allows the host to determine the state of the meeting presentation at the time of the text message. Thus, if the text message includes a comment or question about the content of the meeting presentation, the host can determine a context for the text message based on the presentation event. For example, the meeting presentation software may display a text message to the host along with a selectable indicator (see 653 in FIG. 6D, described in further detail herein). The host may select the indicator to place the meeting presentation in the state at the time of the text message to answer a question or comment.

Figure 6A:
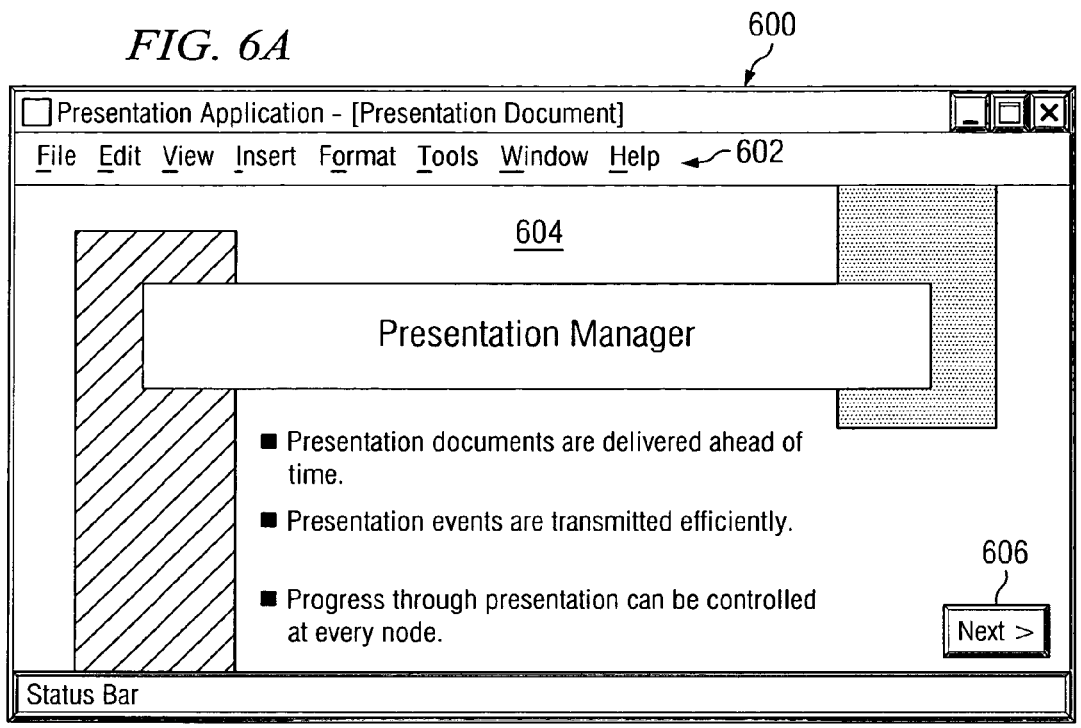

FIGS. 6A-6D depict example screens of display for an online meeting presentation environment in accordance with a preferred embodiment of the present invention. More particularly, FIG. 6A shows an example meeting presentation document being presented by a presentation application and, optionally, meeting presentation software. Presentation application window 600 includes menu bar 602 and display area 604. A presentation document is presented in display area 604. In the depicted example, the presentation document is a presentation graphics document that is generated by a presentation graphics software application such as, for example, Freelance Graphics® from Lotus Development Corporation.

The presentation document includes control 606 that may be selected by a host to advance to the next slide. In accordance with exemplary aspects of the present invention, when the host selects control 606, the host-side meeting presentation management mechanism of the present invention generates a presentation event and sends this event to remote meeting participants. At the participant client, the presentation event is received and the participant-side meeting presentation management mechanism of the present invention effectuates the presentation event in the presentation application.

Operation of the presentation application may be initiated through menu bar 602. For example, the host may navigate to the next slide through the "View" menu.

Figure 6B:
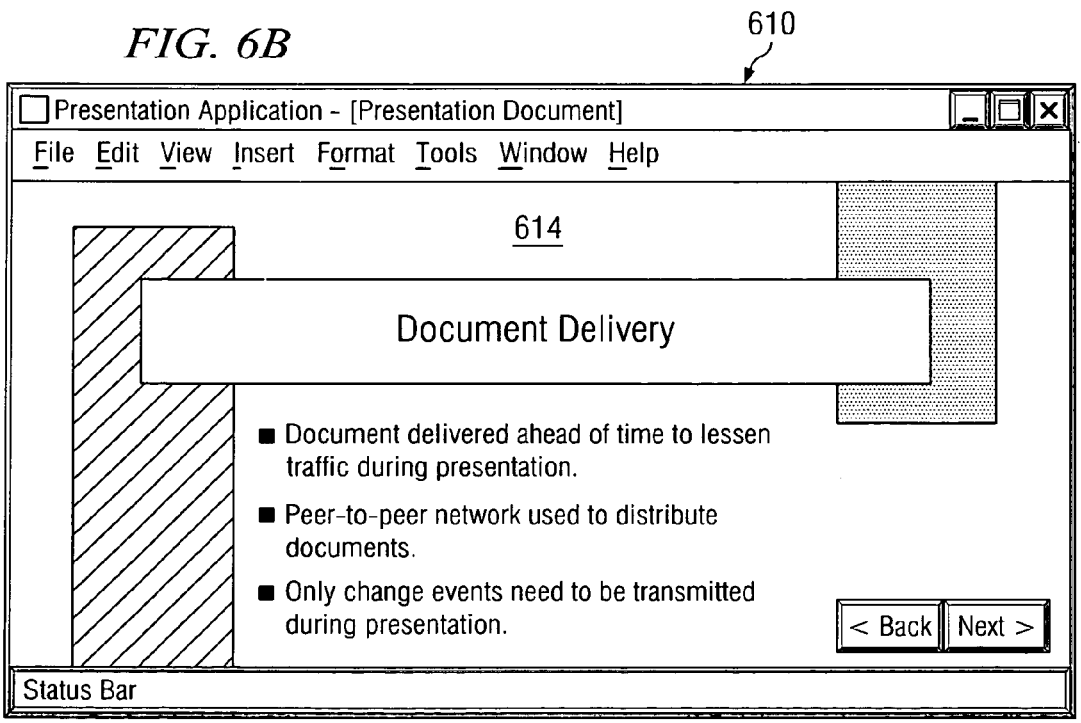

FIG. 6B illustrates a display screen that may result from a presentation event being effectuated at the host or the participant side. Presentation application window 610 includes display area 614 that presents a subsequent slide of a presentation document.

FIG. 6C depicts an example screen of display for a participant-side online meeting presentation application. Application window 620 includes menu bar 622 and display area 624.

A presentation document, as controlled remotely by a host, is presented in display area 624. As the host generates and sends presentation events to the participants, these presentation events are effectuated by the presentation application and the results are presented in display area 624.

Meeting presentation control area 630 includes, for example, a text message field 632, progress slider 634, and presentation controls 636. The participant may send direct feedback to the host by typing a question or comment into text message field 632 and pressing the "Send" button.

The meeting presentation progress is depicted using progress slider 634, which includes two progress indicators. The top progress indicator 638 may indicate how far through the presentation the host has progressed, while the bottom progress indicator 640 may indicate current position of the participant. The participant may locally navigate to a previous point in the presentation by moving the bottom progress indicator 640 using a mouse cursor or the like.

Presentation controls 636 also allow the participant to control the presentation locally. For example, the controls, from left to right, may allow the participant to navigate to the first slide of the presentation graphics document, navigate to the previous slide, pause/play, navigate to the next slide, and navigate to the last slide. Similar navigation may also be controlled for other types of presentation documents. For example, navigating to a previous presentation event may perform an "undo" operation to return to a previous state and navigating to a next presentation event may perform an operation similar to a "redo" operation based on the received presentation events.

Operation of the participant-side online meeting presentation application may be initiated through menu bar 622. For example, the participant may navigate to the previous presentation event through the "View" menu. Presentation controls 636 may also control playback of streaming media received from the host.

Figure 6D:
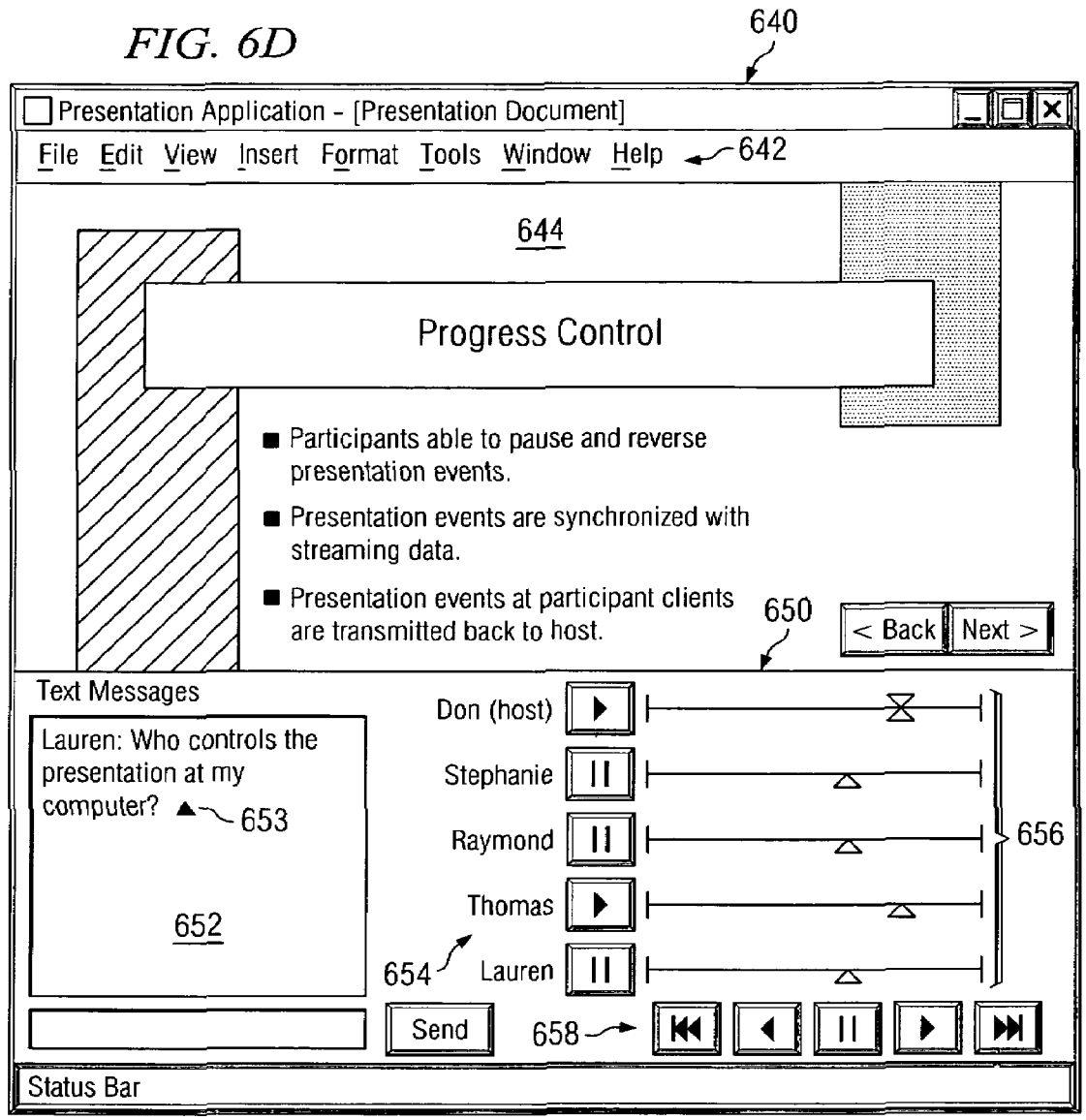

FIG. 6D depicts an example screen of display for a host-side online meeting presentation application. Application window 640 includes menu bar 642 and display area 644. A presentation document is presented in display area 644 and the host may manipulate the presentation document to progress through the online meeting in display area 644. As the host generates and sends presentation events to the participants, these presentation events are effectuated by the presentation application and the results are presented in display area 644.

Meeting presentation control area 650 includes, for example, a text message display field 652, participant status indicators 654, progress sliders 656, and presentation controls 658. Text messages from participants are presented in text message display field 652. The host may occasionally glance at text message display field 652 to determine whether participants have any questions or comments. Each text message includes a status indicator 653. The host may select indicator 653 to view the state of the meeting presentation at the time the participant generated the text message. If selected, that presentation state would be presented in display area 644. The host could then un-select indicator 653 to toggle the meeting presentation back to its previous state.

Participant status indicators 654 indicate the current status of the participants. More particularly, each participant status indicator denotes whether the corresponding participant has the meeting presentation paused or in a state of playing. In the depicted example, Stephanie, Raymond, and Lauren have the meeting presentation paused, while Thomas and Don, the host, have the meeting presentation playing and up-to-date.

Progress sliders 656 indicate the position of each of the participants within the meeting presentation. The first (top) progress slider is for Don, the host. This progress slider includes two progress indicators. The top progress indicator indicates how far through the presentation the host has progressed since the meeting started, while the bottom progress indicator indicates the current position of the host. The host may navigate to any position (e.g. page) in the presentation by moving the bottom progress indicator using a mouse cursor or the like.

Each of the other progress sliders includes only a bottom progress indicator that denotes the current position of the host. The host may navigate a given participant to any position in the presentation by moving the bottom progress indicator for that participant using a mouse cursor or the like. As a result, the host will generate an individual presentation event message and transmit the individual presentation event message to the appropriate participant. The meeting presentation software will then navigate to the position chosen by the host in the participant-side application.

Participant status indicators 654 and participant progress sliders 656 allow the host to manage the flow of the online meeting presentation. For example, in the depicted illustration, Stephanie, Raymond, and Lauren appear to be viewing the same slide. The host may determine that more time must be spent reviewing that slide. The host may also determine when one participant is catching up or when a majority of participants are peeking ahead in the presentation, for instance.

Presentation controls 658 allow the host to control the online meeting presentation. For example, the controls, from left to right, may allow the host to navigate to the first slide of the presentation graphics document, navigate to the previous slide, pause/play, navigate to the next slide, and navigate to the last slide. Similar navigation may also be controlled for other types of presentation documents. For example, navigating to a previous presentation event may perform an "undo" operation to return to a previous state and navigating to a next presentation event may perform an operation similar to a "redo" operation based on the received presentation events.

Operation of the host-side online meeting presentation application may be initiated through menu bar 642. For example, the host may navigate to the previous presentation event through the "View" menu.

FIG. 7 is an exemplary functional block diagram of a host-side online meeting presentation system in accordance with a preferred embodiment of the present invention. The elements of the functional block diagram of FIG. 7 may be implemented as hardware, software, or a combination of hardware and software components.

As shown in FIG. 7, host-side online meeting presentation system 700 includes a controller 702, presentation software 704, presentation management software 706, media streaming application 708, text messaging application 710, communications adapter 712, and participant status storage 714. These elements are in communication with one another via the control/data bus 720. Although a bus architecture is shown in FIG. 7, the present invention is not limited to such and any architecture allowing for the communication of control messages and data between the elements 702-714 may be used without departing from the spirit and scope of the present invention.

Controller 702 controls the overall operation of the host-side meeting presentation system. Presentation software 704 presents a presentation document to the host and provides controls for managing the presentation at the host.

Presentation management software 706 performs functions for controlling the presentation at remote participant systems. Presentation management software 706 receives presentation events from presentation software 704 and sends these presentation events to participants through communications adapter 712. Presentation management software 706 also receives participant status messages from participants. The participant status information obtained from participant status messages is stored in participant status storage 714.

Media streaming application 708 transmits audio, video, or other media to participants through communications adapter 712. In one preferred embodiment, media streaming application 708 is a "Web cam" application that allows the host to send audio and video of the host to remotely connected participants.

Text messaging application 710 receives text messages from participants through communications adapter 712 and presents the messages to the host. Text messaging application 710 may be modified to identify participant status information in text messages and to communicate participant status information to presentation management software 706. Text messaging application 710 may also allow the host to compose and send text messages to remotely connected participants.

Combinations of presentation software 704, presentation management software 706, media streaming application 708, and text messaging application 710 may be integrated into a single piece of software. For example, presentation management software 706 may be packaged with media streaming application 708 and text messaging application 710. As another example, presentation management software 706 may be integrated into presentation software 704 using a plug-in or the like.

Figure 8:
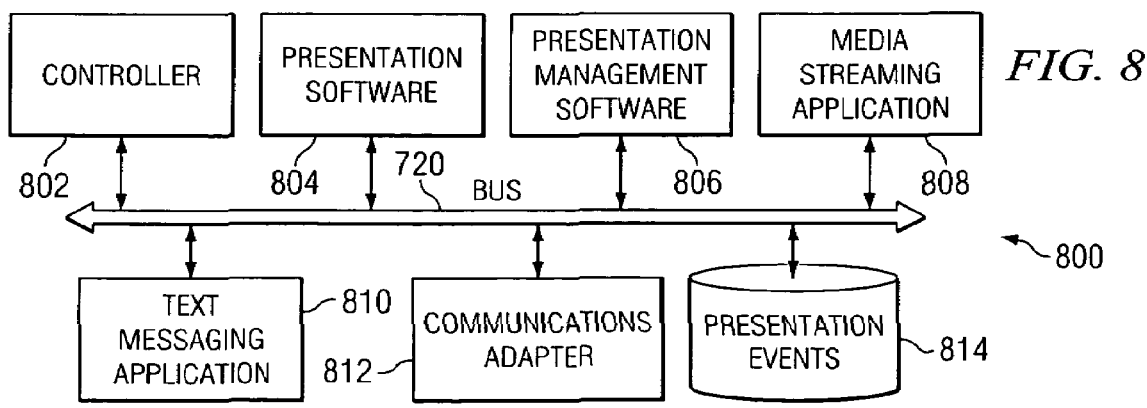
FIG. 8 is an exemplary functional block diagram of a participant-side online meeting presentation system in accordance with a preferred embodiment of the present invention.

FIG. 8 is an exemplary functional block diagram of a participant-side online meeting presentation system in accordance with a preferred embodiment of the present invention. The elements of the functional block diagram of FIG. 8 may be implemented as hardware, software, or a combination of hardware and software components.

As shown in FIG. 8, participant-side online meeting presentation system 800 includes a controller 802, presentation software 804, presentation management software 806, media streaming application 808, text messaging application 810, communications adapter 812, and presentation event storage 814. These elements are in communication with one another via the control/data bus 820. Although a bus architecture is shown in FIG. 8, the present invention is not limited to such and any architecture allowing for the communication of control messages and data between the elements 802-814 may be used without departing from the spirit and scope of the present invention.

Controller 802 controls the overall operation of the participant-side meeting presentation system. Presentation software 804 presents a presentation document to the participant. Presentation management software 806 performs functions for managing the presentation as controlled by the host. Presentation management software 806 receives presentation events from the host through communications adapter 812. Presentation management software 806 also sends participant status messages to the host. Presentation events are stored in presentation event storage 814. The participant may use the presentation events to control the presentation locally.

Media streaming application 808 receives audio, video, or other media from the host through communications adapter 812. In one preferred embodiment, media streaming application 808 is a "Web cam" application that allows the participant to receive audio and video of the host to accompany and explain the meeting presentation content. Presentation management software 806 may also index presentation events to the media stream.

Text messaging application 810 allows the participant to compose text messages and send the text messages to the host through communications adapter 812. Text messaging application 810 may be modified to insert into the text messages an identifier that denotes participant status information from presentation management software 806. Text messaging application 810 may also receive text messages from the host.

Combinations of presentation software 804, presentation management software 806, media streaming application 808, and text messaging application 810 may be integrated into a single piece of software. For example, presentation management software 806 may be packaged with media streaming application 808 and text messaging application 810. As another example, presentation management software 806 may be integrated into presentation software 804 using a plug-in or the like.

Figure 9:
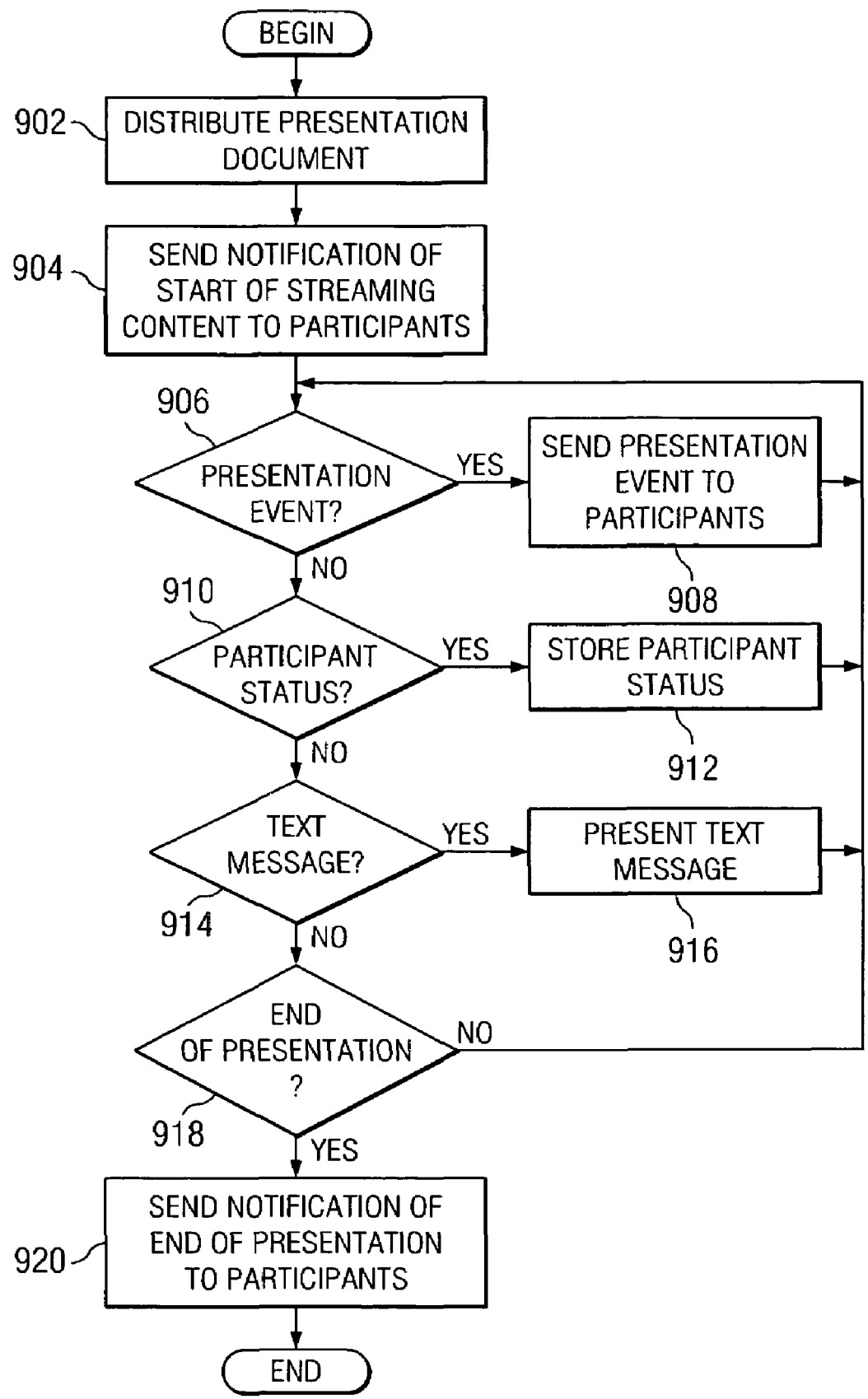
FIG. 9 is a flowchart illustrating the operation of a host-side online meeting presentation system in accordance with a preferred embodiment of the present invention.

FIG. 9 is a flowchart illustrating the operation of a host-side online meeting presentation system in accordance with a preferred embodiment of the present invention. Operation begins and the host-side online meeting presentation system distributes the presentation document (block 902). At the beginning of the meeting, the host-side online meeting presentation system sends a notification of the start of streaming content to the participants (block 904).

Then, a determination is made as to whether a presentation event is generated by the host using a presentation application (block 906). If a presentation event is generated, the host-side online meeting presentation system sends the presentation event to the meeting participants (block 908) and operation returns to block 906 to determine whether a presentation event is generated by the host using a presentation application.

If the host does not generate a presentation event in block 906, a determination is made as to whether a participant status message is received from a participant (block 910). If a participant status message is received, the host-side online meeting presentation system stores participant status information from the participant status message (block 912) and operation returns to block 906 to determine whether the host generates a presentation event using a presentation application.

If a participant status message is not received in block 910, a determination is made as to whether a text message is received from a participant (block 914). If a text message is received, the host-side online meeting presentation system presents the text message (block 916) and operation returns to block 906 to determine whether the host generates a presentation event using a presentation application.

If a text message is not received in block 914, a determination is made as to whether the end of the presentation is reached (block 918). The end of the presentation may be reached, for example, when the host selects a control, closes the presentation document, stops streaming media content, or the like. If the host is at the end of the presentation, the host-side online meeting presentation system sends notification of the end of the presentation to participants (block 920) and operation ends. Otherwise, if the host is not at the end of the presentation in block 918, operation returns to block 906 to determine whether the host generates a presentation event using a presentation application.

Figure 10:
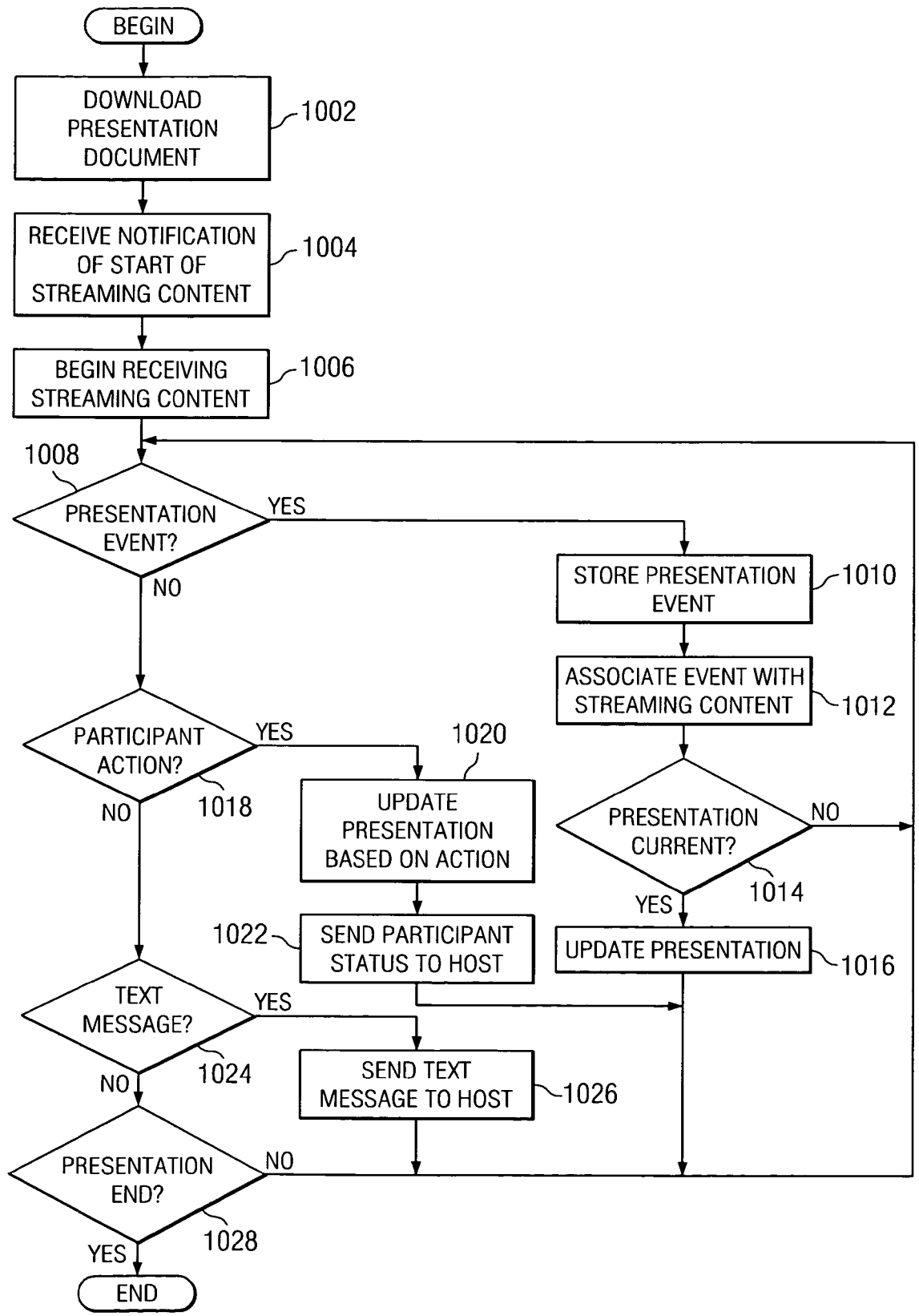
FIG. 10 is a flowchart illustrating the operation of a participant-side online meeting presentation system in accordance with a preferred embodiment of the present invention.

FIG. 10 is a flowchart illustrating the operation of a participant-side online meeting presentation system in accordance with a preferred embodiment of the present invention. Operation begins and the participant-side online meeting presentation system downloads a presentation document for the online meeting presentation (block 1002). The participant-side online meeting presentation system receives a notification of the start of streaming content from the host (block 1004) and begins receiving streaming content (block 1006).

Then, a determination is made as to whether a presentation event is received from the host (block 1008). If a presentation event is received, the participant-side online meeting presentation system stores the presentation event (block 1010) and associates the event with the streaming content (block 1012). Next, a determination is made as to whether the presentation at the participant side is current (block 1014). If the presentation is current, the participant-side online meeting presentation system updates the presentation based on the presentation event (block 1016) and operation returns to block 1008 to determine whether a presentation event is received from the host. Otherwise, if the presentation is not current in block 1014, operation returns to block 1008 to determine whether a presentation event is received from the host.

If a presentation event is not received in block 1008, a determination is made as to whether a participant action is taken with respect to locally controlling the meeting presentation (block 1018). If a participant action is taken, the participant-side online meeting presentation system updates the presentation based on the action (block 1020) and sends a participant status message to the host (block 1022). Thereafter, operation returns to block 1008 to determine whether a presentation event is received from the host.

If a participant action is not taken in block 1018, a determination is made as to whether a text message is to be sent to the host (block 1024). If a text message is to be sent, the participant-side online meeting presentation system sends the text message to the host (block 1026) and operation returns to block 1008 to determine whether a presentation event is received from the host.

If a text message is not to be sent to the host in block 1024, a determination is made as to whether the end of the presentation is reached (block 1028). The end of the presentation may be reached, for example, when a notification of the end of the presentation is received from the host, when the participant closes the presentation management software, or the like. If the end of the presentation is reached, operation ends; otherwise, operation returns to block 1008 to determine whether a presentation event is received from the host.

The present invention solves the disadvantages of the prior art by providing a mechanism for efficiently distributing and remotely managing meeting presentations. Participants download presentation documents to local storage ahead of time. The presentation then runs in an environment that allows the meeting host to send events to the participants to remotely manage the meeting. In one preferred embodiment, the participants are allowed to control the meeting events locally and a status is transmitted back to the host. The host may then view the status of each of the participants to help control progress through the meeting. Thus, communication of presentation events is streamlined because the presentation documents are downloaded ahead of time and managed locally at the participant workstations. Furthermore, the extra bandwidth may be used for media streaming, text messaging, and communication of feedback. The host may view the status and position of meeting participants to help control the flow of the meeting presentation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing an online meeting presentation, the computer implemented method comprising:

distributing an online meeting presentation document to a plurality of remotely connected recipient-participants prior to a start of the online meeting presentation, wherein the online meeting presentation document includes one of a word processing document, a diagramming document, a computer aided design document, a spreadsheet, and a presentation graphics document, wherein the online presentation document is distributed to the plurality of remotely connected recipient-participants from a meeting host-participant to a first recipient-participant and from the first recipient-participant to other recipient-participants from recipient-participant to recipient-participant, and wherein the online meeting presentation document is stored by the plurality of remotely connected recipient-participants in a local persistent storage;

responsive to the meeting host-participant performing a first operation on the online meeting presentation, sending a presentation event message to each recipient-participant of the plurality of remotely connected recipient-participants, wherein the presentation event message is available for use by each recipient-participant of the plurality of remotely connected recipient-participants to update progress of the online meeting presentation for each of the plurality of remotely connected recipient-participants, and wherein the presentation event message is sent to the plurality of remotely connected recipient-participants by being sent from the meeting host-participant to the first recipient-participant and from the first recipient-participant to the other recipient-participants from recipient-participant to recipient-participant;

responsive to one recipient-participant of the plurality of remotely connected recipient-participants presenting a current status to the meeting host-participant, the meeting host-participant sending an individual presentation event message to the one recipient-participant of the plurality of remotely connected recipient-participants, wherein the individual presentation event message is used to update the current status of the online meeting presentation for the one recipient-participant of the plurality of remotely connected recipient-participants;

presenting the current status of the plurality of remotely connected recipient-participants in a view window of the meeting host-participant to control the flow of the online meeting presentation, wherein the meeting host-participant navigates and controls the online meeting presentation, wherein controlling the online meeting presentation by the meeting host-participant comprises at least one of performing an undo operation to return to a previous presentation event of the online meeting presentation, performing a redo operation to go to a next presentation event of the online meeting presentation, returning to the previous presentation event of the online meeting presentation through a view menu, controlling the online meeting presentation from left to right, navigating to a first slide of the online meeting presentation, navigating to a previous slide of the online meeting presentation, pausing the online meeting presentation, navigating to a next slide of the online meeting presentation, and navigating to a last slide in the online meeting presentation;

responsive to receipt by the meeting host-participant of a recipient-participant status message from any recipient-participant within the plurality of remotely connected recipient-participants, presenting the status message for the any recipient-participant to the meeting host-participant, wherein the status message from the any recipient-participant indicates whether the any recipient-participant has paused the online meeting presentation or is playing the online meeting presentation, wherein each recipient-participant within the plurality of remotely connected recipient-participants have local control of the online meeting presentation, and wherein the local control permits each recipient-participant to perform a recipient-participant action, wherein the recipient-participant action comprises at least one of navigating to a previous point in the online meeting presentation, navigating to a first slide in the online meeting presentation, navigating to a previous slide in the online meeting presentation, navigating to the next slide in the online meeting presentation, pausing the online meeting presentation, and navigating to the last slide in the online meeting presentation;

receiving by the meeting host-participant a text message from a recipient-participant within the plurality of remotely connected recipient-participants, wherein the text message includes a reference to a last online meeting presentation event received by the recipient-participant; and sending a notification of an end of the online meeting presentation to the plurality of remotely connected recipient-participants.

* * * * *